A. G. PLANCHENAULT.

CLASP FOR GARTERS, WRIST BRACELETS, &c.

APPLICATION FILED NOV. 13, 1919.

Reissued Jan. 4, 1921. 15,020.

INVENTOR

Alexander G. Planchenault,

BY Leo. McMatt

ATTORNEY

UNITED STATES PATENT OFFICE.

ALEXANDER G. PLANCHENAULT, OF COYTESVILLE, NEW JERSEY, ASSIGNOR TO NATIONAL CLASP CO., INC., OF NEW YORK, N. Y., A CORPORATION OF NEW YORK.

CLASP FOR GARTERS, WRIST-BRACELETS, &c.

15,020. Specification of Reissued Letters Patent. Reissued Jan. 4, 1921.

Original No. 1,246,654, dated November 13, 1917, Serial No. 124,763, filed October 10, 1916. Application for reissue filed November 13, 1919. Serial No. 337,837.

*To all whom it may concern:*

Be it known that I, ALEXANDER G. PLANCHENAULT, a citizen of the United States, and residing in Coytesville, county of Bergen, and State of New Jersey, have invented new and useful Improvements in Clasps for Garters, Wrist-Bracelets, &c., of which the following is a specification.

This invention relates to clasps, being particularly adapted for jewelry and garments and the like and has for its objects the provision of a simple effective and cheap construction which is both durable and attractive in appearance.

Heretofore many attempts have been made to construct a clasp which would operate upon the depression of one or more retractile plungers to release a catch and permit of the opening of the clasp, and I accordingly do not broadly lay claim to such constructions.

My invention is fully set forth and described in the accompanying specification and drawings forming a part thereof, in which—

Figure 1:
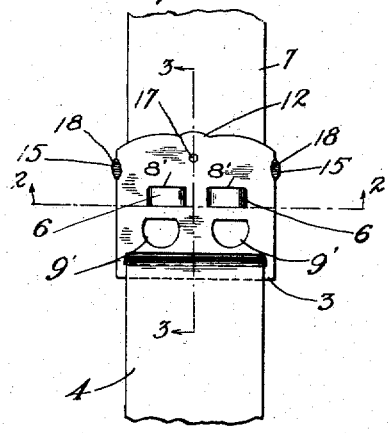
Figure 1 is a plan view of my improved clasp applied to a belt.
Figure 4:
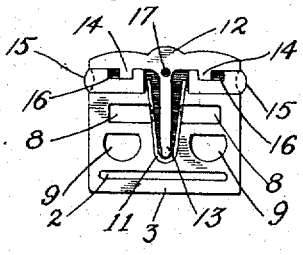
Fig. 4 is a plan view, with the top plate removed, of the clamping member.
Figure 2:
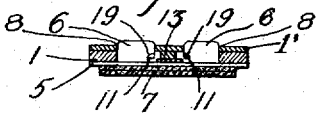
Fig. 2 is a central transverse section along the line 2—2, of Fig. 1.
Figure 5:
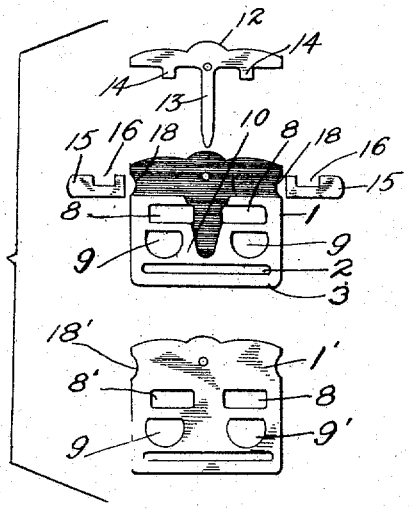
Fig. 5 is a plan view showing the various unassembled elements of the clasp exclusive of the spring and retaining pin.

Referring to the drawings and the construction shown therein, the reference numerals 1, 1′ designate the bottom and top plates respectively of clamping member of the clasp;—*i. e.* the member containing the clamping or catch mechanism, the same being provided with a slot 2 at one end thereof which forms a bar 3 adapted to be connected with a suitable belt or ribbon 4 or if desired secured to a rigid member as one half of a bracelet for example. The other member consists of a plate 5 consisting of a rectangular frame having a central integral longitudinal web portion (the transverse side bars of said frame not being shown) from which latter integral lugs 6 project. Said skeleton plate is adapted to be secured to another ribbon or belt 7 or rigid member as the other half of a bracelet. Preferably said ribbon passes over one of the longitudinal edges of said plate 5, beneath the central web, over the other longitudinal edge and thence is looped beneath the plate and secured to the main portion of the ribbon by stitching or in any other suitable manner. The said plates 1, 1′ are provided with pairs of elongated slots 8, 8′ adapted when superimposed, to receive the lugs 6. It is also preferably provided with apertures 9, 9′ adapted when superimposed to enhance the ornamental appearance thereof. The plate 1 is coincident with the plate 1′ and between these two plates is positioned an intermediate plate 10. The space between the plates 1, 1′, created by the intermediate plate 10, as indicated by the line shading in Fig. 5, is adapted to receive a V-shaped spring 11, formed preferably of steel wire, but it may be of gold or other material if desired, and also a positioning member or pin 13 which latter serves to retain the spring 11 in position after the parts are assembled. Suitable lugs 14 are carried by the head 12, the same being adapted to limit the movement of plungers 15 when projecting into slots 16 thereof, as occurs when the head 12 is fixed in position between the plates 1 and 1′ by means of a pin 17, which passes through apertures in the plates 1 and 1′ and the pin 13 and serves to rigidly unite the same together. The edges of the plates 1 and 1′ are cut away to form thumb holes 18, 18′ so as to permit of the inward movement of the plungers 15 when it is desired to compress the arms of the spring 11, and release the lugs 6, which when inserted in the slots 8, 8′ are normally locked in engagement with the clamping member by the arms of said spring projecting under the shoulders 19 of said lugs 6.

The operation of the clasp by the pressure of the thumb and forefinger upon the ends of the plungers 15 with the consequent compression of the arms of the spring 11 until they escape from beneath the shoulders 19 and permit of the withdrawal of the lugs 6 from the clamping member, is evident from the above described construction.

Figure 3:
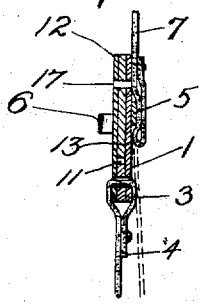
Fig. 3 is a central longitudinal section along the line 3—3 of Fig. 1.

As indicated in Fig. 3 the plate 5 may be slidingly and adjustably mounted on a belt or ribbon 7 if desired, all without departing from the spirit of my invention.

Various modifications of the clasp may obviously be made without departing from the spirit of the invention as set forth in the annexed claims.

Having thus described my invention, what I claim and desire to secure by Letters Patent is:

1. A clasp consisting of two members, one member being provided with a plurality of lugs having shoulders on their adjacent faces and the other member being provided with apertures adapted to snugly receive said lugs, and a V-shaped spring secured within the latter member positioned intermediate the respective outermost limits of said apertures, adapted to normally project beneath the said shoulders when said lugs are inserted in said apertures, plungers capable of limited transverse travel adapted to optionally compress the respective arms of said spring so as to release said lugs from engagement therewith, and positioning means projected between said apertures and adapted to hold said spring between said apertures after the assembling of the parts.

2. A clasp consisting of two members, one member being provided with a plurality of lugs having shoulders on their adjacent faces and the other member being provided with apertures adapted to snugly receive said lugs, and a V-shaped spring secured within the latter member positioned intermediate the respective outermost limits of said apertures, adapted to normally project beneath the said shoulders when said lugs are inserted in said apertures, plungers capable of limited transverse travel adapted to optionally compress the respective arms of said spring so as to release said lugs from engagement therewith, and positioning means adapted to hold said spring between said apertures after the assembling of the parts.

3. A clasp consisting of two members, one member being provided with a lug having a shoulder, and the other member being provided with an aperture adapted to snugly receive said lug, a spring secured between the members and adapted to normally project beneath the shoulder on said lug when the latter is inserted in said aperture, and a plunger capable of limited travel and adapted to optionally disengage said spring from said shoulder on the lug, for the purpose described.

4. In a clasp of the character designated, the combination of two relatively non-rotatable members, one formed with a shouldered lug and the other with an aperture adapted to snugly receive said lug, a spring latch positioned between the two members and adapted normally to engage the shoulder on said lug, and means for optionally disengaging said spring latch from said shouldered lug, for the purpose described.

5. In a clasp of the character designated, the combination of two members, one formed with a plurality of shouldered lugs, and the other member being formed with apertures adapted to snugly receive said shouldered lugs, spring latches positioned between the two members and adapted to normally engage the shoulders on said lugs, and means for optionally and simultaneously disengaging said spring latches from said shouldered lugs, for the purpose described.

6. A clasp consisting of two separable superimposed members, of which one has catches and the other passages for said catches, a resilient means between said members adapted normally, when said members are assembled, to directly engage said catches and lock the said members together, and lateral means for releasing said resilient member to unlock the members.

7. A clasp consisting of two members, one member being provided with a plurality of lugs having shoulders and the other member being provided with apertures adapted to receive said lugs, and a spring secured within the latter member adapted to normally project beneath the said shoulders when said lugs are inserted in said apertures, plungers adapted to optionally compress the respective arms of said spring so as to release said lugs from engagement therewith, and positioning means adapted to hold said spring between said apertures after the assembling of the parts.

8. A clasp consisting of two members, one member being provided with a plurality of lugs having shoulders and the other member being provided with apertures adapted to receive said lugs, and a spring secured within the latter member adapted to normally project beneath the said shoulders when said lugs are inserted in said apertures, and plungers adapted to optionally compress the respective arms of said spring so as to release said lugs from engagement therewith.

ALEXANDER G. PLANCHENAULT.

Witnesses:
HARRY BISCHOFF,
JACOB J. POMEROY.